United States Patent
Chandil et al.

(10) Patent No.: US 12,333,634 B2
(45) Date of Patent: Jun. 17, 2025

(54) CURVE GENERATION FOR SKETCH VECTORIZATION

(71) Applicant: Adobe Inc., San Jose, CA (US)

(72) Inventors: Ashwani Chandil, Noida (IN); Vineet Batra, Pitam Pura (IN); Matthew David Fisher, Burlingame, CA (US); Deepali Aneja, Seattle, WA (US); Ankit Phogat, Noida (IN)

(73) Assignee: Adobe Inc., San Jose, CA (US)

( * ) Notice: Subject to any disclaimer, the term of this patent is extended or adjusted under 35 U.S.C. 154(b) by 84 days.

(21) Appl. No.: 17/519,357

(22) Filed: Nov. 4, 2021

(65) Prior Publication Data

US 2023/0137233 A1 May 4, 2023

(51) Int. Cl.
*G06T 11/20* (2006.01)
*G06T 3/403* (2024.01)
*G06T 7/12* (2017.01)
*G06T 7/181* (2017.01)
(Continued)

(52) U.S. Cl.
CPC ............ *G06T 11/203* (2013.01); *G06T 3/403* (2013.01); *G06T 7/12* (2017.01); *G06T 7/181* (2017.01); *G06T 7/194* (2017.01); *G06V 10/457* (2022.01)

(58) Field of Classification Search
CPC ......... G06T 11/203; G06T 3/403; G06T 7/11; G06T 7/12; G06T 7/181; G06T 7/187; G06T 7/194; G06V 10/26; G06V 10/457; G06V 10/469; G06V 20/00
See application file for complete search history.

(56) References Cited

U.S. PATENT DOCUMENTS

| | | | |
|---|---|---|---|
| 7,636,097 B1 | 12/2009 | Holloway | |
| 10,192,129 B2* | 1/2019 | Price | G06V 10/454 |
| 10,522,253 B2* | 12/2019 | Itu | G06T 7/60 |

(Continued)

OTHER PUBLICATIONS

"Natural neighbor interpolation", Wikipedia, The Free Encyclopedia [online][retrieved Sep. 15, 2021]. Retrieved from the Internet <https://en.wikipedia.org/w/index.php?title=Natural_neighbor_interpolation>., Jan. 21, 2007, 2 Pages.

(Continued)

*Primary Examiner* — Ming Wu
(74) *Attorney, Agent, or Firm* — FIG. 1 Patents

(57) ABSTRACT

Generating a vector representation of a hand-drawn sketch is described. To do so, the sketch is segmented into different superpixel regions. Superpixels are grown by distributing superpixel seeds throughout an image of the sketch and assigning unassigned pixels to a neighboring superpixel based on pixel value differences. The border between each pair of adjacent superpixels is then classified as either an active or an inactive boundary, with active boundaries indicating that the border corresponds to a salient sketch stroke. Vector paths are generated by traversing edges between pixel vertices along the active boundaries. To minimize vector paths included in the vector representation, vector paths are greedily generated first for longer curves along active boundaries until each edge is assigned to a vector path. Regions encompassed by vector paths corresponding to a foreground superpixel are filled to produce a high-fidelity vector representation of the sketch.

20 Claims, 9 Drawing Sheets
(3 of 9 Drawing Sheet(s) Filed in Color)

(51) Int. Cl.
*G06T 7/194* (2017.01)
*G06V 10/44* (2022.01)

(56) References Cited

U.S. PATENT DOCUMENTS

| | | | |
|---|---|---|---|
| 10,726,599 B2* | 7/2020 | Marzban | G06T 7/543 |
| 11,048,932 B2 | 6/2021 | Batra et al. | |
| 2010/0008576 A1 | 1/2010 | Piramuthu | |
| 2011/0221754 A1* | 9/2011 | Wang | G06V 30/1988 |
| | | | 345/440 |
| 2021/0064858 A1 | 3/2021 | Batra et al. | |
| 2023/0109732 A1* | 4/2023 | Hertzmann | G06N 3/0475 |
| | | | 345/427 |
| 2023/0162413 A1 | 5/2023 | Batra et al. | |

OTHER PUBLICATIONS

Batra, Vineet et al., "U.S. Application as Filed", U.S. Appl. No. 17/530,760, filed Nov. 19, 2021, 57 pages.

Olsen, Sven et al., "Image Simplification and Vectorization", NPAR '11: Proceedings of the ACM SIGGRAPH/Eurographics Symposium on Non-Photorealistic Animation and Rendering [retrieved Sep. 20, 2021]. Retrieved from the Internet <http://citeseerx.ist.psu.edu/viewdoc/download?doi=10.1.1.229.1285&rep=rep1&type=pdf>., Aug. 5, 2011, 10 Pages.

Simo-Serra, Edgar et al., "Learning to simplify: fully convolutional networks for rough sketch cleanup", ACM Transactions on Graphics, vol. 35, No. 4 [retrieved Sep. 15, 2021]. Retrieved from the Internet <https://openreview.net/pdf?id=oKI46KgqZe>., Jul. 11, 2016, 11 Pages.

Simo-Serra, Edgar et al., "Mastering Sketching: Adversarial Augmentation for Structured Prediction", ACM Transactions on Graphics, vol. 37, No. 1 [retrieved Sep. 15, 2021]. Retrieved from the Internet <https://openreview.net/pdf?id=Jhkn3is-gl>., Jan. 10, 2018, 13 Pages.

Wang, Ting-Chun et al., "High-Resolution Image Synthesis and Semantic Manipulation With Conditional GANs", Cornell University, arXiv, arXiv.org [retrieved Dec. 13, 2021]. Retrieved from the Internet <https://openaccess.thecvf.com/content_cvpr_2018/CameraReady/0768.pdf>., Nov. 2017, 10 Pages.

Zhu, Jun-Yan et al., "Unpaired Image-to-Image Translation using Cycle-Consistent Adversarial Networks", 2017 IEEE International Conference on Computer Vision (ICCV) [retrieved Dec. 13, 2021]. Retrieved from the Internet <https://eva.fing.edu.uy/pluginfile.php/320560/mod_resource/content/1/Zhu_Unpaired_Image-To-Image_Translation_ICCV_2017_paper.pdf>., Nov. 15, 2018, 10 pages.

"Non-Final Office Action", U.S. Appl. No. 17/530,760, filed Mar. 20, 2025, 25 pages.

* cited by examiner

700

702

704

CURVE GENERATION FOR SKETCH VECTORIZATION

BACKGROUND

Sketching plays a significant role in the digital graphic design process, as digital graphics often originate from paper sketches. For instance, artists often first create sketches on paper using pen or pencil before turning to computer-implemented tools to create a digital version of the sketch. Conventional approaches for digital graphics generation convert paper sketches to digital vector graphics by representing underlying sketch geometry as Bezier curves. With advances in computing device technology, some digital graphics systems enable artists to scan or take a picture of a sketch and convert the sketch into a digital graphic format. However, conventional approaches are unable to generate high-fidelity vector representations of sketches, and important content depicted in a sketch is often lost during generation of the corresponding vector representation.

SUMMARY

A vectorization system is described that generates a vector representation of an input image, such as an image depicting an artist's hand-drawn sketch. To generate the vector representation, the vectorization system generates a grayscale version of the input image, where sketch strokes are represented as black foreground pixels contrasted against white background pixels representing a medium (e.g., paper) upon which the sketch was drawn. The grayscale version of the input image is then segmented into different superpixel regions that each include a collection of contiguous pixels. The vectorization system is configured to identify these superpixel regions by designating pixels distributed uniformly throughout the grayscale version of the image as superpixel seeds. Superpixel seeds are classified as foreground or background superpixel seeds based on their underlying pixel values. Superpixels are grown from the superpixel seeds by assigning unassigned pixels in the grayscale image to a neighboring superpixel, based on a difference in pixel values between an unassigned pixel and a neighboring pixel assigned to a superpixel.

When each pixel in the grayscale image is assigned to a superpixel, the vectorization system classifies the border between each pair of adjacent superpixels as either an active boundary or an inactive boundary. Active boundaries indicate that the border between adjacent superpixels corresponds to a salient sketch stroke in the input image. Inactive boundaries indicate that the adjacent superpixels either both display foreground content or both display background content. Vector paths are then generated by traversing edges between pixel vertices along the active boundaries. To minimize vector paths included in the resulting vector representation, vector paths are greedily generated first for longer curves represented by the active boundaries, until each edge in the active boundaries has been assigned to a vector path. The vectorization system then identifies regions encompassed by one or more vector paths corresponding to foreground sketch strokes in the input image and fills the region to produce a high-fidelity vector representation of the input image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. In some implementations, entities represented in the figures are indicative of one or more entities and thus reference is made interchangeably to single or plural forms of the entities in the description.

DETAILED DESCRIPTION

Overview

Figure 1:
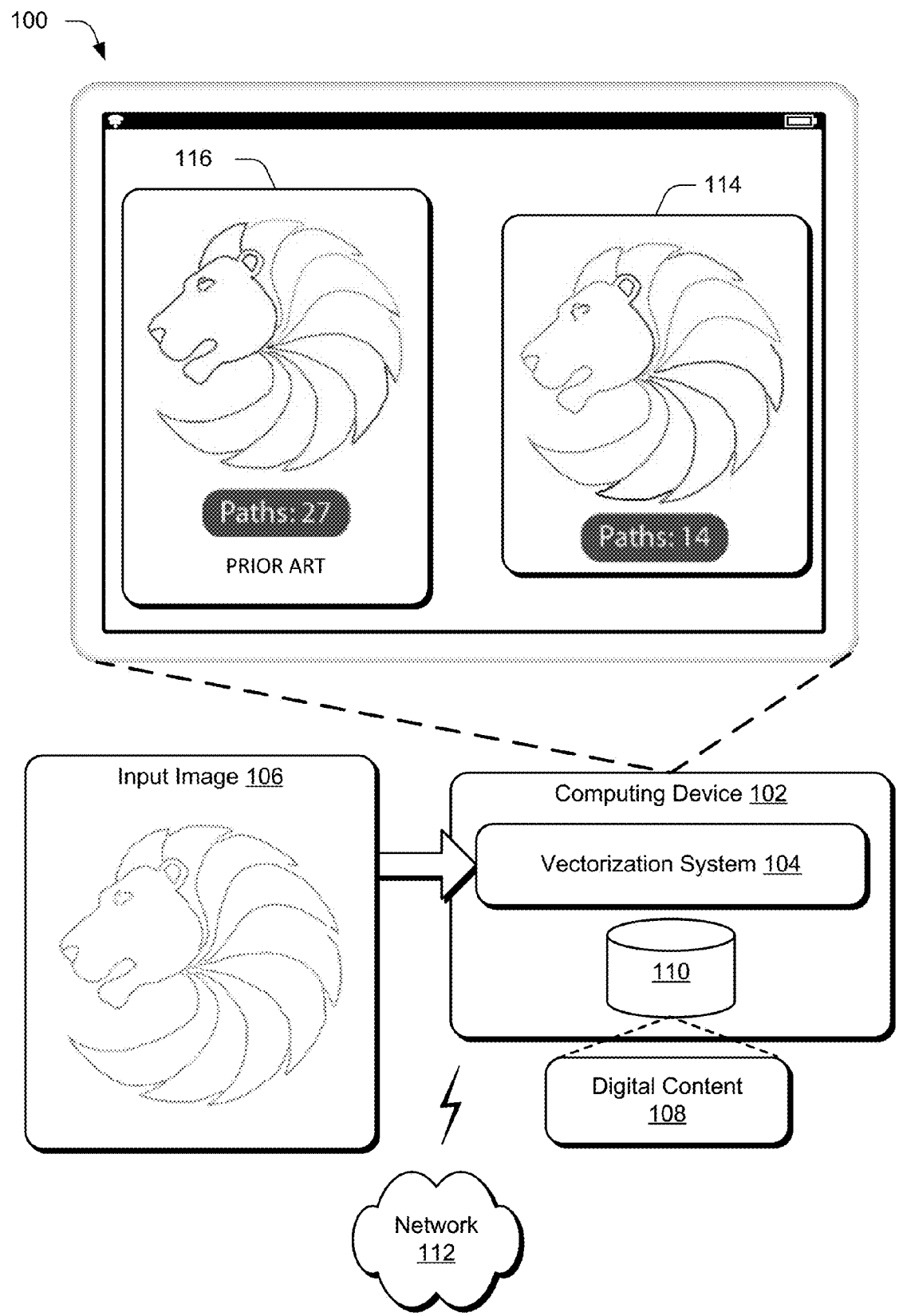
FIG. 1 is an illustration of a digital medium environment in an example implementation that is operable to employ a vectorization system to generate a vector representation of an input image.

To assist content creators in translating paper sketches into digital vector graphic representations, conventional systems map images of sketch inputs to vector outputs. However, the vectorization results provided by conventional approaches are unsuitable for subsequent editing and processing because they fail to capture an artist's intent. For instance, instead of recreating natural artist strokes as drawn on paper during creation of the sketch, conventional vectorization systems output a set of vector paths that include multiple piece-wise Bezier segments. Frequently, adjacent vector paths corresponding to a single stroke in the artist's hand-drawn sketch are not output in contiguous z-order, making subsequent modifications to an otherwise single sketch stroke complex and tedious even for experienced digital graphic designers.

To address these conventional shortcomings, a vectorization system is described that generates a vector representation of an input image depicting an artist's hand-drawn sketch in a manner that captures semantic relationships between strokes in the hand-drawn sketch. To do so, the vectorization system generates a grayscale version of the input image, where sketch strokes are represented as black foreground pixels contrasted against white background pixels representing a medium (e.g., paper) upon which the sketch was drawn. The sketch is then segmented into different superpixels by distributing superpixel seeds throughout the input image. Superpixel seeds are classified as foreground or background superpixel seeds based on their underlying pixel values, such that foreground superpixels represent contiguous pixels including artist sketch strokes and background superpixels represent the underlying medium carrying the sketch. Superpixels are grown from the superpixel seeds by assigning unassigned pixels to a neighboring superpixel, based on a difference in pixel values between an unassigned pixel and a neighboring pixel assigned to a superpixel.

After assigning each pixel in the image depicting the sketch to one of the superpixel regions, the vectorization system classifies borders between each pair of adjacent superpixels as either an active boundary or an inactive boundary. Active boundaries indicate that the border between adjacent superpixels corresponds to a salient sketch stroke in the input image. Inactive boundaries indicate that the adjacent superpixels either both display foreground content or both display background content of the input image. Vector paths are then generated by traversing edges between pixel vertices along the active boundaries. The vector paths are generated using an algorithm constrained to prefer continuing straight lines along the longest available curve via the active boundaries. After being assigned to a vector path, active boundaries are discarded from further consideration, and the algorithm continues to greedily define vector paths using subsequently available longest preferred curves until all active boundaries are assigned to a vector path. Regions encompassed by vector paths that correspond to a foreground of the input image (e.g., sketch strokes represented by foreground superpixels) are then filled with a foreground pixel value to mimic a visual appearance of the artist's sketch in the corresponding vector representation.

By employing such a greedy vectorization algorithm, the vectorization system produces compact vector geometry including fewer paths relative to conventional vectorization approaches. This compact geometry and fewer paths correspond to the natural order of strokes manually drawn by an artist in creating the input sketch. Consequently, the resulting vector representation is easier to process and edit while maintaining a high-fidelity representation of the underlying sketch.

In the following description, an example environment is described that is configured to employ the techniques described herein. Example procedures are also described that are configured for performance in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. As used herein, the term "digital medium environment" refers to the various computing devices and resources utilized to implement the techniques described herein. The digital medium environment 100 includes a computing device 102, which is configurable in a variety of manners.

The computing device 102, for instance, is configurable as a desktop computer, a laptop computer, a mobile device (e.g., assuming a handheld or wearable configuration such as a tablet, mobile phone, smartwatch, etc.), and so forth. Thus, the computing device 102 ranges from full resource devices with substantial memory and processor resources (e.g., personal computers, game consoles) to low-resource devices with limited memory and/or processing resources (e.g., mobile devices). Additionally, although a single computing device 102 is shown, the computing device 102 is representative of a plurality of different devices, such as multiple servers utilized to perform operations "over the cloud."

The computing device 102 is illustrated as including a vectorization system 104. The vectorization system 104 is depicted as receiving an input image 106. The input image 106 is representative of a raster image of an artist's sketch, such as a picture or scan of a hand-drawn sketch on paper using pen, pencil, etc. The input image 106 is thus representative of digital content 108 maintained in storage 110 of the computing device 102, maintained in storage of a different computing device connected to the computing device 102 via network 112, or combinations thereof.

The vectorization system 104 represents functionality of the computing device 102 to generate a vector representation 114 of the input image 106. The vector representation 114 includes a plurality of vector paths (e.g., Bezier curves), where individual vector paths correspond to portions of the input image 106 that include sketch strokes (e.g., artist-intended pen or pencil strokes rather than background paper lines, smudges, shadows, etc.). The vector representation 114 generated by the vectorization system 104 represents an improvement over results generated by conventional systems configured to generate a vector representation of an input image 106.

For instance, vector representation 116 depicts an example of a vector representation of the input image 106 generated by a conventional system. In the illustrated example of FIG. 1, the vector representation 114 includes 14 different vector paths representing the input image 106, where each vector path is depicted in a different color relative to nearby vector paths. In contrast to the vector representation 114, the vector representation 116 includes 27 different vector paths representing the same input image 106. This significant difference in a number of vector paths used to represent the same input image 106 represents how conventional vectorization approaches fail to preserve a semantic relationship between vector geometry and the underlying sketch strokes drawn by an artist that the vector geometry represents.

As an example, consider the eye of the lion depicted in the input image 106, as represented by vector representation 114 and vector representation 116. Vector representation 114 depicts the eye of the lion using only two vector paths, contrasted with the use of five different vector paths to depict the same eye in vector representation 116. While the respective vector paths of vector representations 114 and 116 both exhibit visual similarity to the input image 106, the semantic structures of respective vector geometries depicting the eye in the input image 106 differ significantly. Consequently, subsequently editing the vector geometry representing the eye of the lion in the input image 106 is increasingly tedious and prone to human error when processing the vector representation 116 relative to the vector representation 114.

For instance, resizing vector paths often requires manipulating individual vector paths to achieve a different size, as selecting a group of vectors and performing a global resize operation on the group of vectors often results in unintended changes to underlying geometry of one or more vector paths in the group of vectors. Thus, a designer is forced to manually adjust a size of each of the five different vector paths representing the lion's eye in the vector representation 116. Conversely, achieving a same eye-size modification in the vector representation 114 is enabled by manually adjusting a size of only two different vector paths.

The vector representation 114 generated using the techniques described herein thus represents a compact geometry of vector paths that preserves a semantic relation between strokes originally drawn in the input image 106, using fewer vector paths relative to conventional approaches. Further, the vector paths included in the vector representation 114 correspond to a natural order of artist-drawn strokes in the input image 106. For instance, the vector representation 116 represents a left-most tip of the lion's mane from input image 106 as a separate vector path (depicted in red) connecting two adjacent vector paths (each depicted in green). The same portion of the lion's mane from input image 106 is represented in the vector representation 114 using only two vector paths (depicted in gold and turquoise). The use of only two vector paths in the vector representation 114 to depict this left-most portion of the lion's mane thus more accurately represents an artist's natural strokes used in the input image 106 (e.g., two strokes connecting at the left-most tip of the lion's mane) relative to the three disjointed vector paths of vector representation 116.

The techniques described herein thus enable the vectorization system 104 to generate a high-fidelity vector representation 114 of the input image 106 in a manner that avails convenient editing of underlying vector geometry.

Having considered an example digital medium environment, consider now a description of an example system useable to generate a vector representation of an underlying sketch depicted by an input image.

Vector Path Generation System

Figure 2:
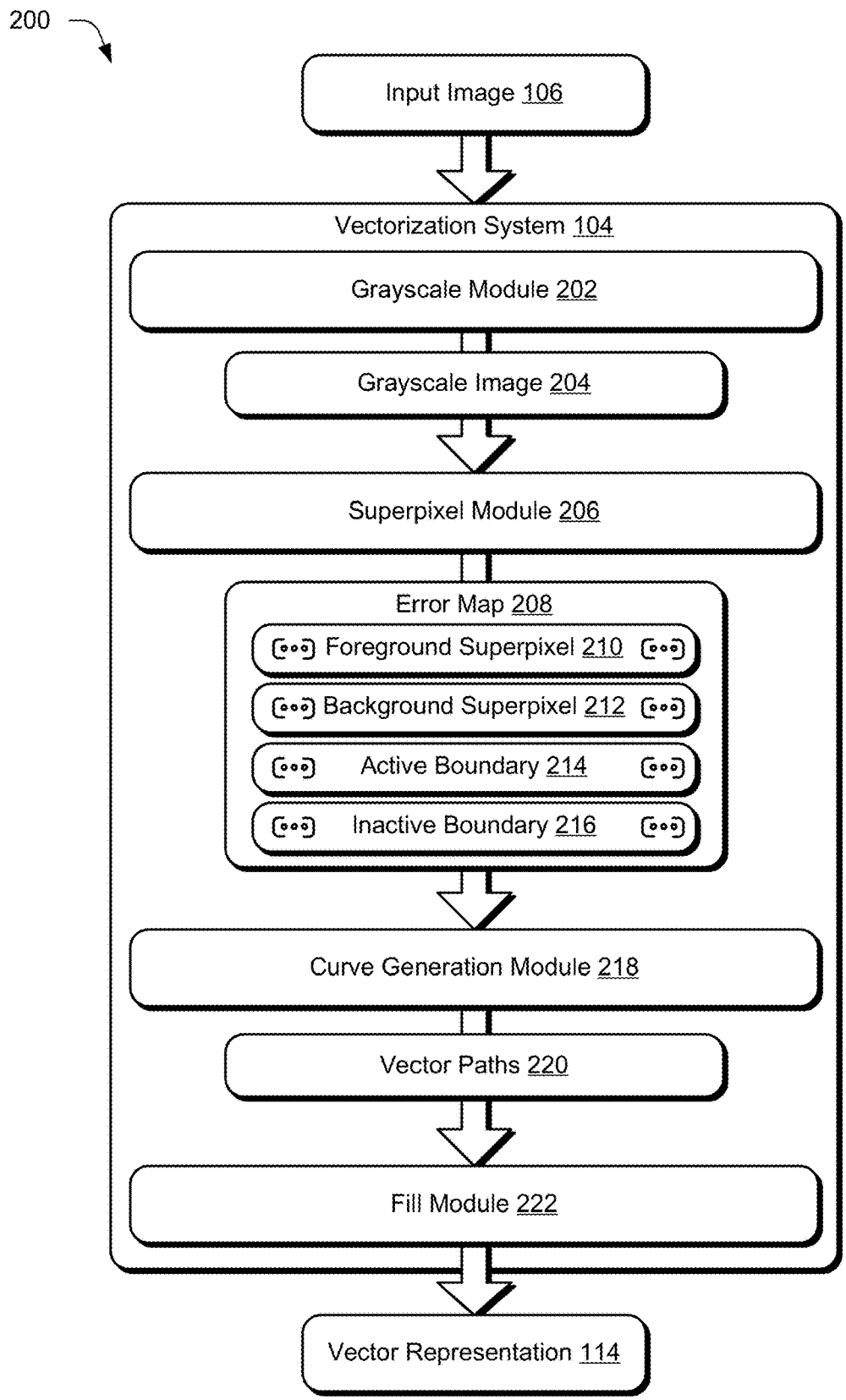
FIG. 2 depicts a digital medium environment showing operation of the vectorization system of FIG. 1 in greater detail.

FIG. 2 depicts a digital medium environment 200 in an example implementation showing operation of the vectorization system 104 of FIG. 1 in greater detail.

Figure 3:
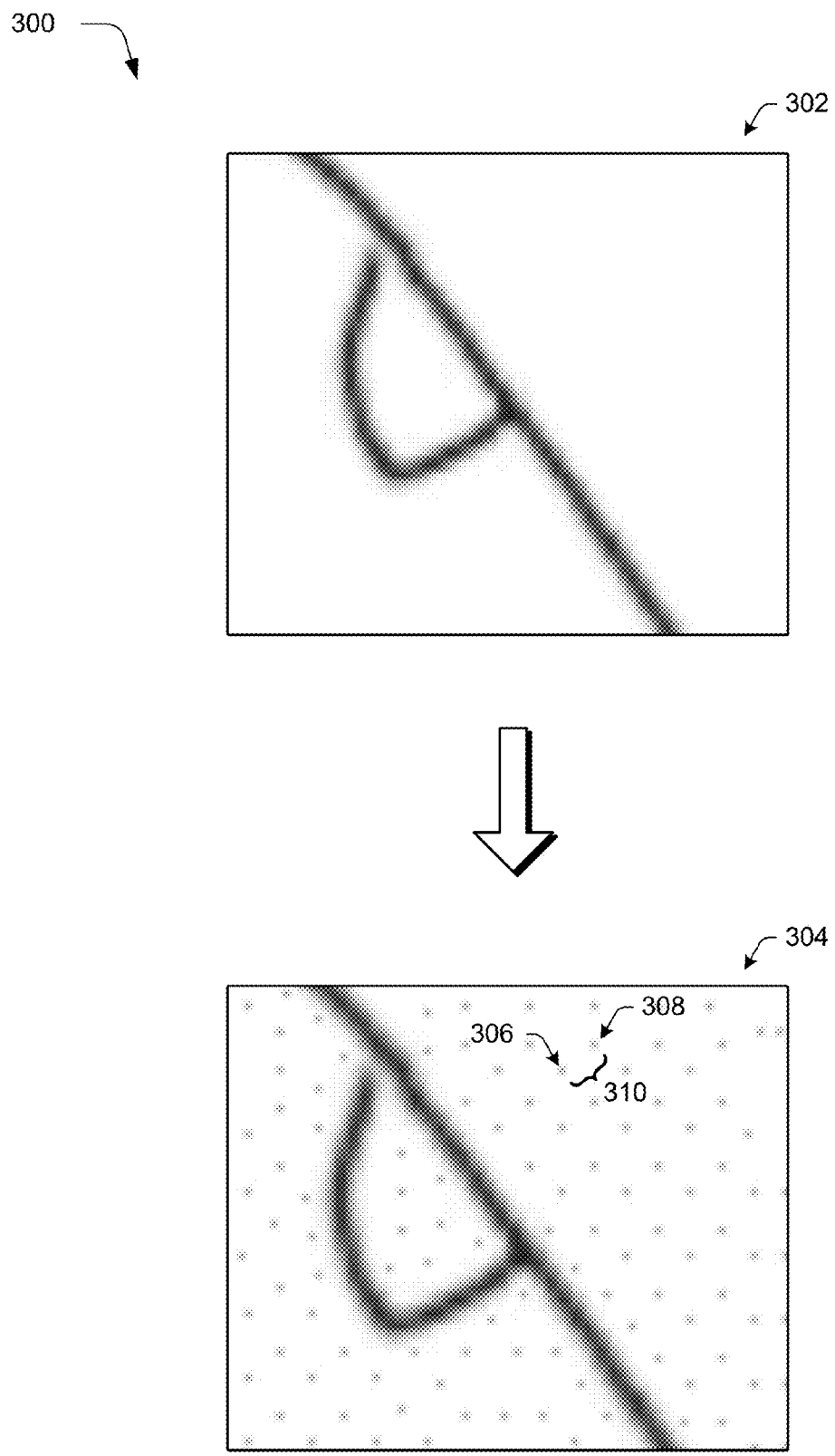
FIG. 3 depicts a digital medium environment in an example implementation of distributing superpixel seeds among pixels of an input image as part of generating a vector representation of the input image.

FIG. 3 depicts a digital medium environment 300 that includes an example implementation of the vectorization system 104 of FIG. 1 distributing superpixel seeds among pixels of an input image as part of generating a vector representation of the input image.

Figure 4:
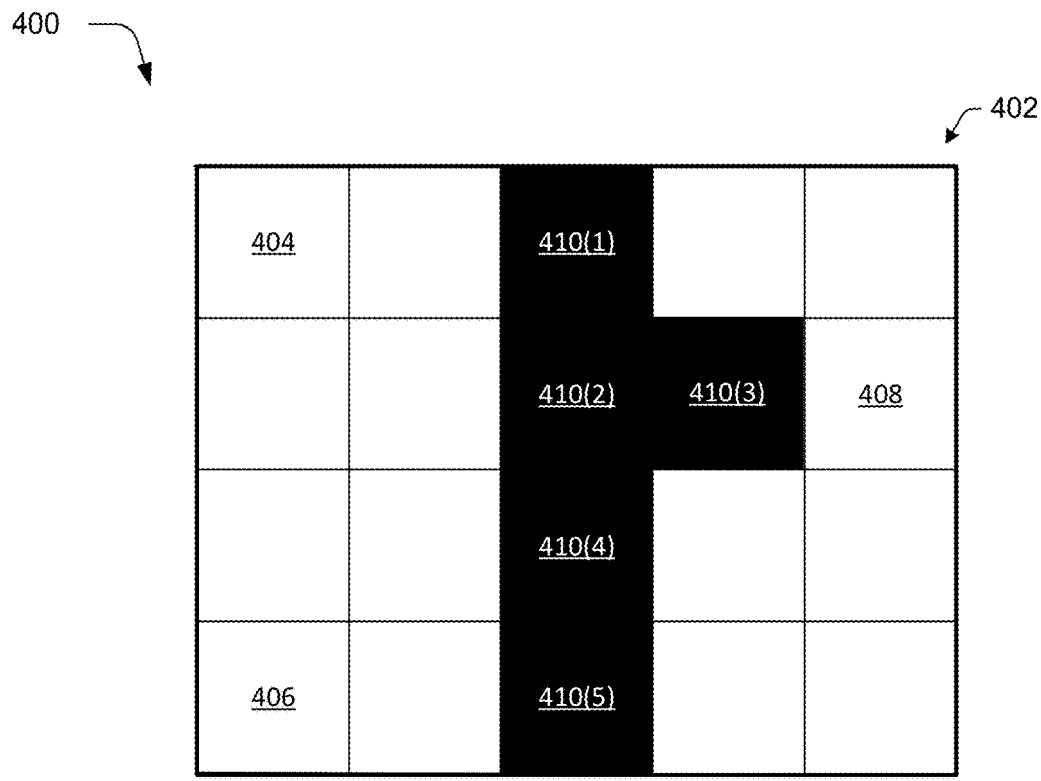
FIG. 4 depicts a digital medium environment in an example implementation of growing superpixels from superpixel seeds as part of generating a vector representation of an input image.
Figure 4:
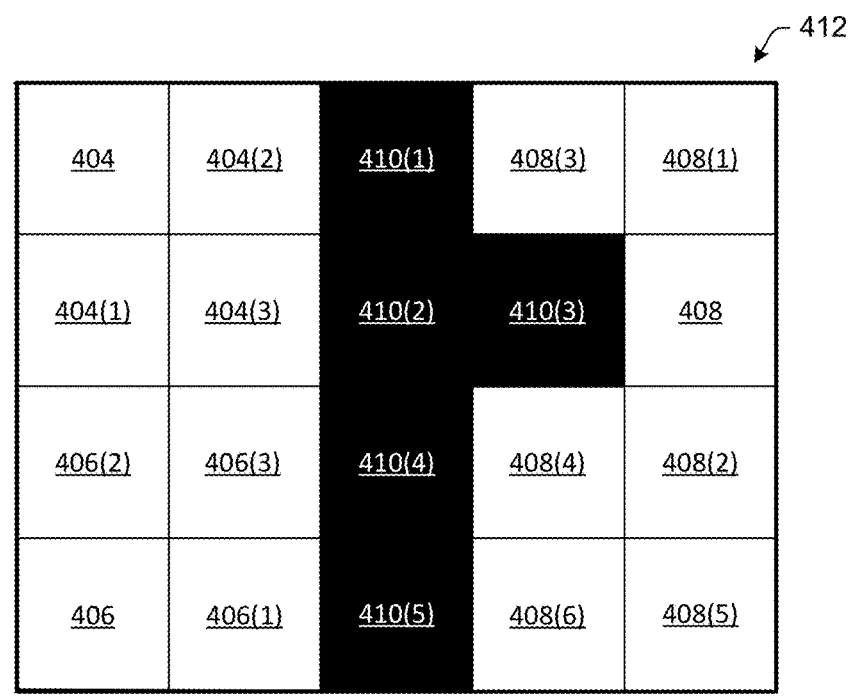

FIG. 4 depicts a digital medium environment 400 that includes an example implementation of the vectorization system 104 of FIG. 1 growing superpixels from superpixel seeds as part of generating a vector representation of an input image.

Figure 5:
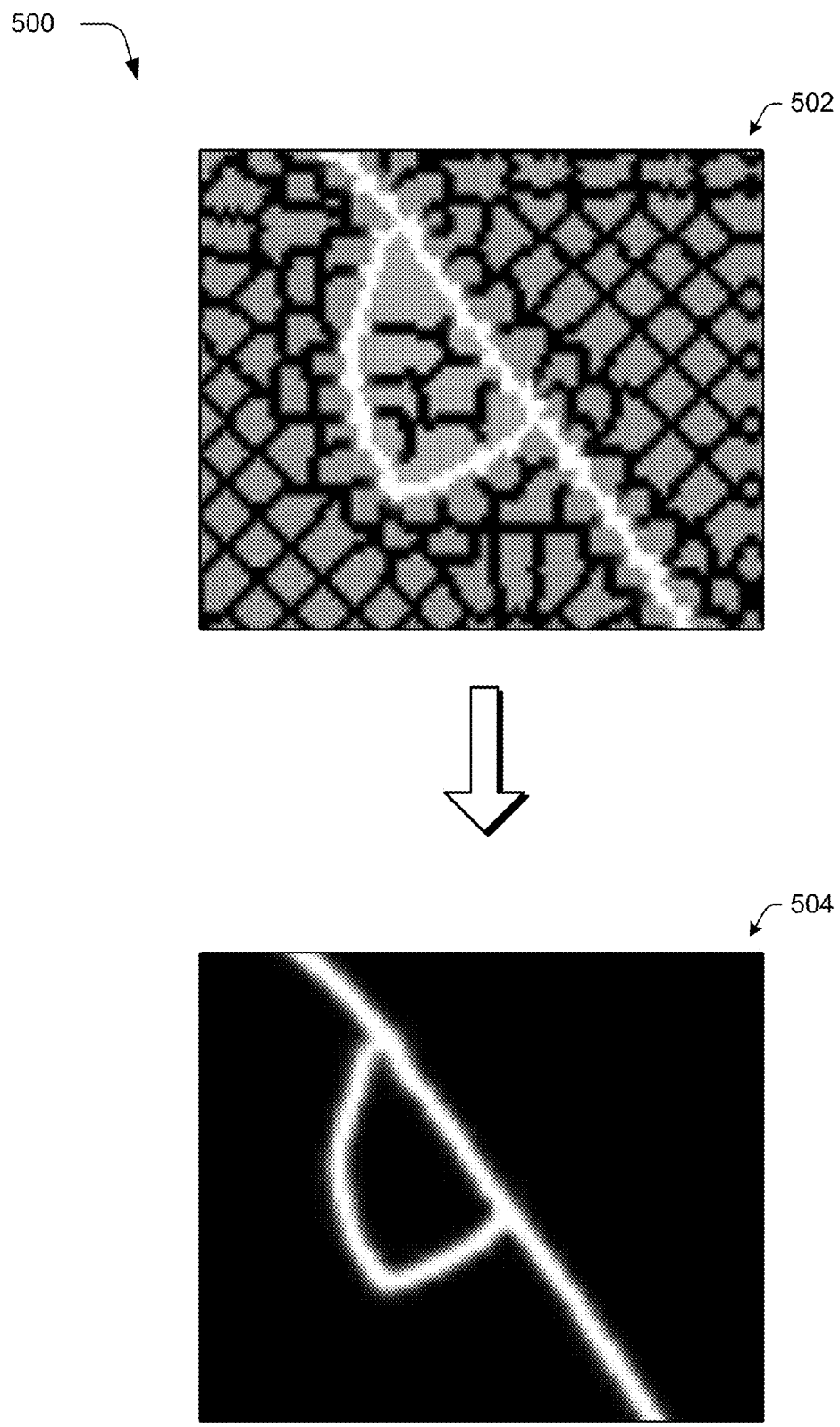
FIG. 5 depicts a digital medium environment in an example implementation of detecting salient edges in an input image using superpixel boundaries as part of generating a vector representation of the input image.

FIG. 5 depicts a digital medium environment 500 in an example implementation of the vectorization system 104 of FIG. 1 detecting salient edges in an input image using superpixel boundaries as part of generating a vector representation of the input image.

Figure 6:
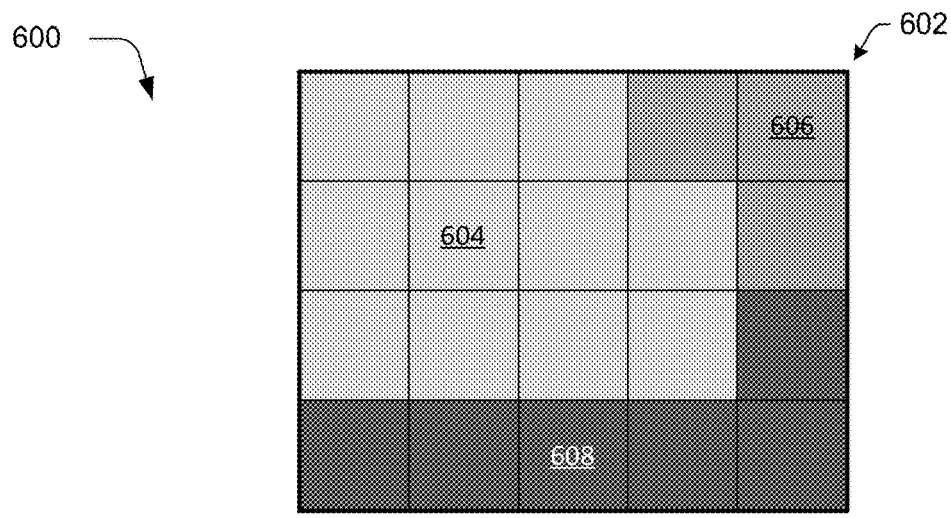
FIG. 6 depicts a digital medium environment in an example implementation of generating curves based on salient edges detected in an input image as part of generating a vector representation of the input image.
Figure 6:
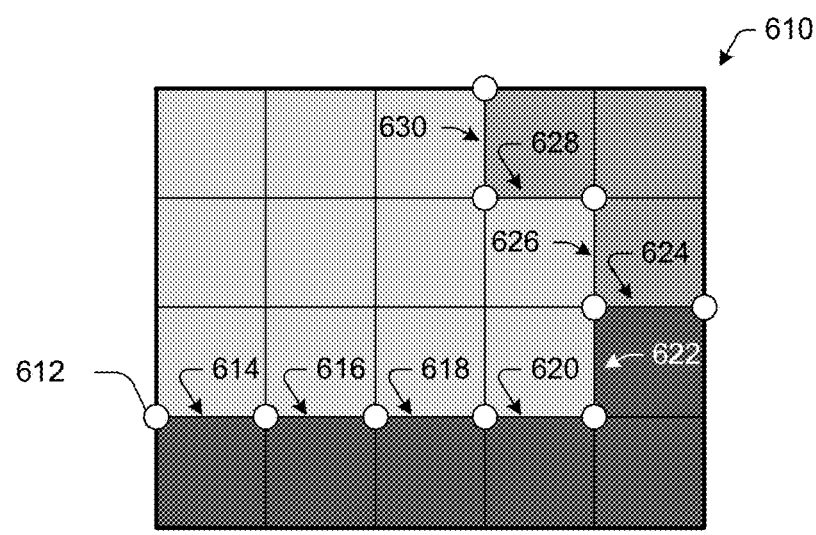
Figure 6:
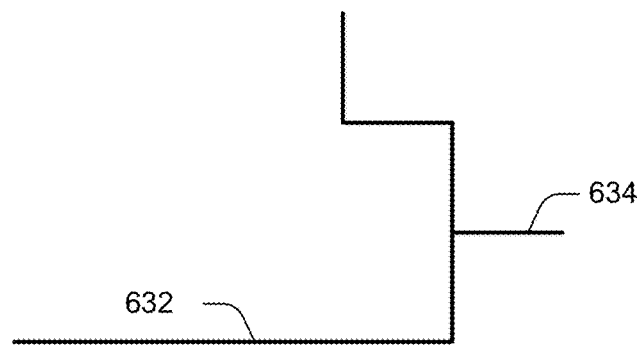

FIG. 6 depicts a digital medium environment 600 in an example implementation of the vectorization system 104 of FIG. 1 generating curves based on salient edges detected an input image as part of generating a vector representation of the input image.

Figure 7:
FIG. 7 depicts a digital medium environment in an example implementation of filling regions encompassed by curves that correspond to foreground superpixels as part of generating a vector representation of an input image.
Figure 7:
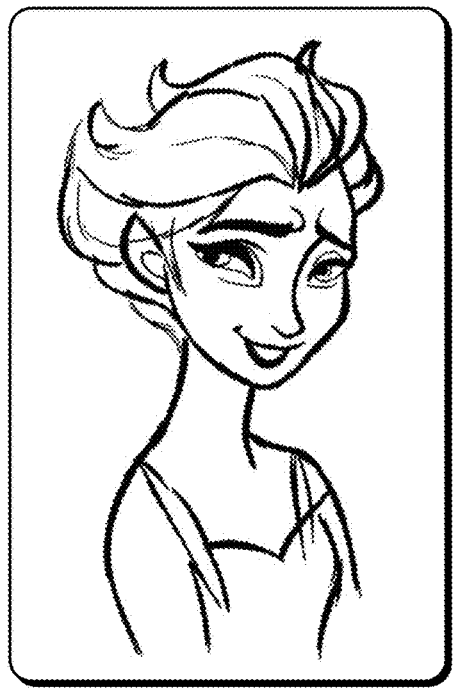

FIG. 7 depicts a digital medium environment 700 in an example implementation of the vectorization system 104 of FIG. 1 filling regions encompassed by curves that correspond to foreground superpixels as part of generating a vector representation of an input image.

As illustrated in FIG. 2, the vectorization system 104 receives an input image 106 and provides the input image 106 to a grayscale module 202. The grayscale module 202 is configured to generate a grayscale image 204, which is a representation of the input image 106 in a grayscale format. Each pixel in the grayscale image 204 is thus represented by a value that indicates an intensity of the pixel from black to white. In some implementations pixels are assigned a value between zero and 255, inclusive, where zero represents black and 255 represents white. Alternatively, greyscale values are normalized such that pixel values range from zero to one, with zero indicating black and one indicating white.

The grayscale image 204 is then provided to a superpixel module 206. The superpixel module 206 is configured to generate an error map 208 for the input image 106 using the grayscale image 204. The error map 208 includes information specifying at least one of a foreground superpixel 210 or a background superpixel 212. Each foreground superpixel 210 is representative of a region in the input image 106 corresponding to an artist's stroke to be represented as a vector path in the vector representation 114. Conversely, each background superpixel 212 is representative of a region in the input image 106 that does not correspond to an artist's stroke to be represented as a vector path in the vector representation 114, such as region depicting paper or other medium used to convey the artist's sketch.

Each foreground superpixel 210 and background superpixel 212 in the error map 208 is representative of a contiguous group of pixels in the input image 106, such that each pixel in the grayscale image 204 is assigned to one superpixel in the error map 208. After segmenting the grayscale image 204 into a plurality of superpixels, the superpixel module 206 is configured to analyze each pair of adjacent superpixels and classify a border between the pair of adjacent superpixels as being either active or inactive.

Active borders are representative of a transition between a foreground and a background in the input image 106 near the border of a pair of adjacent superpixels. In response to identifying an active border between a pair of adjacent superpixels, the active border is recorded in the error map 208 as an active boundary 214. Inactive borders are representative of a transition from a foreground to a foreground, or a transition from a background to a background, in the input image 106 when traversing the border between a pair of adjacent superpixels. In response to identifying an inactive border between a pair of adjacent superpixels, the inactive border is recorded in the error map 208 as an inactive boundary 216. For a detailed description of how the superpixel module 206 generates error map 208, consider FIGS. 3-5.

In the illustrated example of FIG. 3, image 302 is representative of a grayscale image 204 generated from an input image 106 by the grayscale module 202. To derive superpixels included in the error map 208, the superpixel module 206 is configured to first distribute superpixel seeds throughout the image 302. Distributing superpixel seeds is performed by designating individual pixels of the image 302 as superpixel seeds and classifying each superpixel seed based on the pixel's value, relative to a foreground threshold.

For instance, consider an example scenario where each pixel has an associated value ranging from zero (black) to one (white) and a background threshold is 0.5. In this example scenario, pixels designated as superpixel seeds having a value that fails to satisfy the background threshold (e.g., values less than or less than or equal to 0.5) are classified as foreground superpixel seeds. Conversely, pixels designated as superpixel seeds having a value that satisfies the background threshold (e.g., values greater than or greater than or equal to 0.5) are classified as background superpixel seeds.

To ensure uniform distribution throughout the image 302, the superpixel module 206 enforces distances between superpixel seeds. In an example implementation, the distances specify a first distance for spacing commonly classified superpixel seeds (e.g., spacing foreground superpixel seeds from one another or spacing background superpixel seeds from one another) and a second distance for spacing differently classified superpixel seeds (e.g., spacing foreground superpixel seeds from background superpixel seeds). In some implementations, the first distance for spacing commonly classified superpixel seeds represents an exact distance at which commonly classified superpixel seeds are spaced, while the second distance for spacing differently classified superpixel seeds represents a minim distance by which differently classified superpixel seeds are spaced. Each distance is quantified by any suitable number of pixels (e.g., 10 pixels for the first distance and 15 pixels for the second distance).

In the illustrated example of FIG. 3, image 304 represents an instance of image 302 seeded with superpixel seeds. Superpixel seed 306 and superpixel seed 308 represent example background superpixel seeds due to the white background depicted at corresponding pixel locations in image 302. Distance 310 represents a first distance enforced by the superpixel module 206 for spacing commonly classified superpixel seeds. Because in many implementations an underlying sketch depicted by input image 106 includes only thin lines, the exact distance for spacing background superpixel seeds precludes assigning a foreground superpixel seed spaced at a minimum distance from a nearby background superpixel seed.

The illustrated example of FIG. 3 represents an example implementation where the thin lines of image 302 preclude foreground superpixel seed assignment, such that each of the superpixel seeds depicted in image 304 represent background superpixel seeds. Thus, the superpixel module 206 is configured to generate an error map 208 that does not include a foreground superpixel 210. Conversely, in an example implementation where the black lines of image 302 were thick enough to accommodate foreground superpixel seeds spaced at a minimum distance from an adjacent background superpixel seed, a superpixel seed assigned to a corresponding pixel depicting a black line (e.g., a pixel value of one) would be classified as a foreground superpixel seed. After distributing superpixel seeds constrained by the first and second distances, the superpixel module 206 performs region growing to assign each pixel of the grayscale image 204 to one of the superpixel seeds.

In the illustrated example of FIG. 4, region 402 depicts a five-pixel by four-pixel portion of a grayscale image 204. In region 402, pixel 404 represents a first background superpixel seed, pixel 406 represents a second background superpixel seed, and pixel 408 represents a third background superpixel seed. Pixels 410(1)-410(5) represent pixels of the grayscale image 204 that correspond to a sketch stroke in the input image 106. In region 402, pixels other than pixels 404, 406, and 408 represent pixels unassigned to a superpixel seed, including pixels 410(1)-410(5).

To perform region growing by assigning unassigned pixels to one of the superpixel seeds, the superpixel module 206 builds a priority queue, where each entry in the priority queue represents a cost of assigning an unassigned pixel to an adjacent superpixel. The superpixel module 206 initializes the priority queue using unassigned pixels bordering superpixel seeds, such as pixels 404(1), 404(2), 406(1), 406(2), 408(1), and 408(2) as depicted in region 412. The cost of assigning an unassigned pixel to an adjacent superpixel (e.g., of assigning pixel 404(1) to the superpixel seed represented by pixel 404) is defined as the absolute difference between pixel values of an unassigned pixel and an adjacent pixel already assigned to a superpixel.

Thus, for the example region 412 of FIG. 4, the superpixel module 206 initializes the priority queue with entries that identify assignment costs for the following six possible assignments, prioritized based on lowest cost: 1. pixel 404(2) to pixel 404; 2. pixel 404(1) to pixel 404; 3. pixel 406(1) to pixel 406; 4. pixel 406(2) to pixel 406; 5. pixel 408(2) to pixel 408; and 6. pixel 408(1) to pixel 408. After initializing the priority queue, the superpixel module 206 uses the lowest assignment cost to assign an unassigned pixel to a superpixel seed. For instance, the superpixel module 206 initially assigns pixel 404(2) to the first background superpixel seed of pixel 404.

After each pixel assignment, the superpixel module 206 maintains a cumulative cost for each pixel relative to its associated superpixel seed. For instance, continuing the example scenario where pixel 404(2) is first assigned to the first background superpixel seed of pixel 404, the assignment cost required to do so is defined as the cumulative cost for pixel 404(2).

After each pixel assignment, the superpixel module 206 updates the priority queue to include entries defining assignment costs for possible assignments resulting from the previous pixel assignment. For instance, continuing the example scenario where pixel 404(2) is assigned to the first background superpixel seed of pixel 404, the priority queue entry for pixel 404(2) is subsequently removed from the priority queue. The priority queue is then populated with two additional entries: 1. pixel 404(2) to pixel 404(3); and 2. pixel 404(2) to pixel 410(1). The assignment cost for each of these two additional entries is represented in the priority queue as the pixel-specific assignment cost (e.g., the cost of assigning pixel 404(2) to pixel 404(3) or the cost of assigning pixel 404(2) to pixel 410(1)) plus the cumulative cost previously assigned to pixel 404(2) after its assignment to pixel 404. Thus, the priority queue following the assignment of pixel 404(2) to the superpixel seed of pixel 404 would include the following seven entries: 1. pixel 404(1) to pixel 404; 2. pixel 406(1) to pixel 406; 3. pixel 406(2) to pixel 406; 4. pixel 408(2) to pixel 408; 5. pixel 408(1) to pixel 408; 6. pixel 404(2) to pixel 404(3); and 7. pixel 404(2) to pixel 410(1).

The superpixel module 206 continues to assign pixels based on lowest cost as represented by the priority queue, updating and reprioritizing the priority queue as additional pixels are assigned until each pixel of the grayscale image 204 is assigned to a superpixel. With respect to the illustrated example of FIG. 4, this process continues until all pixels of region 412 are assigned. An example of a completed assignment of region 412 includes pixel 404 and pixels 404(1)-404(3) grouped as a first background superpixel; pixel 406 and pixels 406(1)-406(3) grouped as a second background superpixel; and pixel 408, pixels 408(1)-408(6), and pixels 410(1)-410(5) grouped as a third background superpixel.

In this example, although pixels 410(1)-410(5) depict foreground content (e.g., pencil strokes from the sketch depicted in input image 106), this foreground content is not lost via the grouping of pixels 410(1)-410(5) as part of the third background superpixel. Rather, by maintaining a cumulative cost for each individual pixel included in the region 412, the relatively high assignment cost of assigning a pixel depicting foreground content to an adjacent pixel depicting background content (e.g., the cost of assigning pixel 410(3) to pixel 408) is reflected in the foreground pixel's resulting cumulative cost. Thus, despite being grouped as part of the third background superpixel, each of pixels 410(1)-410(5) are individually associated with a cumulative cost that is useable by the vectorization system 104 to infer presence of a sketch stroke in corresponding pixels of the input image 106.

After grouping each pixel in the grayscale image 204 into one of the error map 208 superpixels (e.g., one of the foreground superpixels 210 or background superpixels 212), the superpixel module 206 designates each border between an adjacent pair of superpixels as an active boundary 214 or an inactive boundary 216. To do so, the superpixel module 206 considers the cumulative costs associated with pixels disposed on the border of the adjacent pair of superpixels relative to a boundary threshold. If a difference between the cumulative costs of border pixels for one of the adjacent pair of superpixels relative to the cumulative costs of border pixels for the other one of the adjacent pair of superpixels fails to satisfy the boundary threshold, the border is designated as an inactive boundary 216. Alternatively, if the difference between the cumulative costs of border pixels for one of the adjacent pair of superpixels relative to the cumulative costs of border pixels for the other one of the adjacent pair of superpixels satisfies the boundary threshold, the border is designated as an active boundary 214.

With respect to the illustrated example of FIG. 4, region 412 includes three pairs of adjacent superpixels with borders to be classified as active or inactive boundaries: 1. the border separating pixels 404(1) and 404(3) from pixels 406(2) and 406(3); 2. the border separating pixels 404(2) and 404(3) from pixels (410(1) and 410(2); and 3. the border separating pixels 406(3) and 406(1) from pixels 410(4) and 410(5). Consider an example scenario where pixels 410(1)-410(5) are purely black (e.g., having pixel values of zero) and all other pixels in region 412 are purely white (e.g., having pixel values of one). In this example scenario, border pixels 404(1), 404(3), 406(2), and 406(3) each have an associated cumulative cost of zero, due to each being purely white and being assigned to respective superpixel seeds that are also purely white, with purely white intervening pixels. In contrast, border pixels 410(1), 410(2), 410(4), and 410(5) each have an associated cumulative cost of one, due to each being purely black and being assigned to a purely white superpixel seed (e.g., pixel 408).

Assume in the example scenario that the boundary threshold is set at 0.5. Continuing this example scenario, because there is no difference in cumulative costs among pixels 404(1), 404(3), 406(2), and 406(3), the superpixel module 206 designates the border separating pixels 404(1) and 404(3) from pixels 406(2) and 406(3) as an inactive boundary 216. Conversely, due to the extreme differences in respective cumulative costs (e.g., zero and one), the superpixel module 206 designates the border separating pixels 404(2) and 404(3) from pixels (410(1) and 410(2) and the border separating pixels 406(3) and 406(1) from pixels 410(4) and 410(5) as active boundaries 214.

An active boundary 214 thus represents presence of a salient curve or geometry between an adjacent pair of superpixels while an inactive boundary 216 indicates an absence of a salient curve or geometry between an adjacent pair of superpixels. Although described herein with respect to an example scenario where the boundary threshold is set at 0.5, the superpixel module 206 is configured to set the boundary threshold at any suitable value, relative to values defining black and white in the grayscale image 204. In some implementations, the superpixel module 206 empirically determines the boundary threshold based on pixel values of the grayscale image 204. Although described with respect to an example scenario for identifying active and inactive boundaries between adjacent superpixels of the same classification (e.g., adjacent background superpixels), the superpixel module 206 is configured to designate a border between adjacent superpixels of different classifications as an active boundary 214 regardless of cumulative cost differences between border pixels of the adjacent superpixels. Thus, the active boundaries 214 and the inactive boundaries 216 of the error map 208 represent presence of salient curves (e.g., sketch strokes) at corresponding locations in the input image 106.

FIG. 5 depicts example superpixel borders, active boundaries 214, and inactive boundaries 216 derived from performing region growing using the superpixel seeds in image 304 of FIG. 3. Image 502 represents a result of the superpixel module 206 growing the superpixel seeds depicted in image 304, where black lines depict inactive boundaries 216 between adjacent superpixels and white lines depict active boundaries 214 between adjacent superpixels. Image 504 represents a visualization of the error map 208 for image 302, where active boundaries 214 (depicted in white) are used to indicate presence of salient geometry in the input image 106 and inactive boundaries 216 are disregarded.

The superpixel module 206 then communicates the error map 208 to a curve generation module 218, which is configured to generate one or more vector paths 220 using the active boundaries 214. To do so, the curve generation module 218 regards the error map 208 as a pixel edge graph, such as the example pixel edge graph 602 depicted in FIG. 6. In the illustrated example of FIG. 6, pixel edge graph 602 includes superpixel 604 (comprising 11 pixels), superpixel 606 (comprising three pixels), and superpixel 608 (comprising six pixels). The associated error map 208 represented by pixel edge graph 602 indicates that respective borders between superpixels 604 and 606, superpixels 604 and 608, and superpixels 606 and 608 are each an active boundary 214.

Pixel edge graph 610 represents an instance of the pixel edge graph 602, with vertices at pixel corners along the active boundaries 214 indicated by white circles, such as circle 612. The curve generation module 218 identifies edges between vertices along the active boundaries 214 as eligible candidates for defining one or more vector paths 220 to be included in the vector representation 114. Using the pixel edge graph 610 as an example, the curve generation module 218 identifies edges 614, 616, 618, 620, 622, 624, 626, and 628 for use in generating the one or more vector paths 220.

The curve generation module 218 then processes the identified edges using a curve vectorization algorithm (e.g., using Kappa Curves, Cornucopia as described by Baran, et. al, Sketching Clothoid Splines Using Shortest Paths, In CGF, Vol. 29,2, 2010, 655-664, etc.). Generally, the curve vectorization algorithm begins at an endpoint (e.g., a vertex having only one incident edge, such as the vertex indicated by circle 612 having only incident edge 614) and draws a vector path 220 along the incident edge until reaching a subsequent pixel vertex. The curve vectorization algorithm continues drawing the vector path 220 by favoring edges that continue along a similar direction of the vector path 220. For instance, the curve generation module 218 begins drawing a curve along edges 614, 616, 618, 620, and 622 until reaching the vertex having three incident edges: edges 622, 624, and 626.

The curve generation module 218 opts to continue drawing the vector path 220 from edge 622 along edge 626 instead of along edge 624 due to the common orientation of edges 622 and 626 (e.g., a 180° angle between edges 622 and 626 rather than traversing the 90° angle between edges 622 and 624). By opting to continue drawing the vector path 220 in a similar direction along available edges, the curve generation module 218 selects a longest path to likely represent an artist's stroke in the input image 106, thereby minimizing an amount of vector paths 220 included in the resulting vector representation 114. Continuing the example illustrated in FIG. 6, the curve generation module 218 proceeds to draw the vector path 220 from edge 626 along edges 628 and 630 until reaching another endpoint.

Upon reaching the other endpoint, the curve generation module 218 outputs the vector path 220 and removes edges included in the vector path 220 from the pixel edge graph 610. If any edges remain in the pixel edge graph 610, the curve generation module 218 identifies another endpoint and proceeds to generate vector paths 220 until all edges in the pixel edge graph 610 have been assigned to a vector path. For instance, after generating vector path 632 from edges 614, 616, 618, 620, 622, 626, 628, and 630, the curve generation module 218 identifies edge 624 remaining in the pixel edge graph 610 and generates vector path 634. In some implementations, the curve generation module 218 is configured to first select a longest path of connected edges for use in generating a vector path 220 and iteratively generate vector paths 220 using the longest available path of connected edges in the pixel edge graph 610.

After processing all active boundaries 214 in the error map 208, the one or more vector paths 220 are provided to a fill module 222. The fill module 222 is configured to compare respective positions of the one or more vector paths 220 to the error map 208 and determine whether a region encompassed by one or more vector paths 220 corresponds to a foreground superpixel 210. In response to determining that an encompassed region corresponds to a foreground superpixel 210, the fill module 222 applies a pixel value associated with a superpixel seed of the foreground superpixel 210 to all pixels in the encompassed region. To illustrate functionality of the fill module 222, consider FIG. 7.

As depicted in FIG. 7, image 702 illustrates a collection of vector paths 220 output by the curve generation module 218. Image 704 depicts regions encompassed by the vector paths 220 that correspond to foreground superpixels 210 as being filled by the fill module 222. The fill module 222 is thus configured to depict regions otherwise represented in the input image 106 by thick sketch strokes and represented as outlines by the curve generation module 218 as foreground pixels. Alternatively, in implementations where the fill module 222 does not identify any regions encompassed by one or more vector paths 220 corresponding to a foreground superpixel 210, the fill module 222 avoids assigning a foreground superpixel seed value to regions encompassed by one or more vector paths 220.

The fill module 222 then outputs the one or more vector paths 220 and optionally filled regions as the vector representation 114 of the input image 106. The vectorization system 104 is thus configured to generate a high-fidelity vector representation 114 of the input image 106 that minimizes a number of vector paths 220 used to do so.

Having considered example systems and techniques, consider now example procedures to illustrate aspects of the techniques described herein.

Example Procedures

The following discussion describes techniques that are configured to be implemented utilizing the previously described systems and devices. Aspects of each of the procedures are configured for implementation in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-7.

Figure 8:
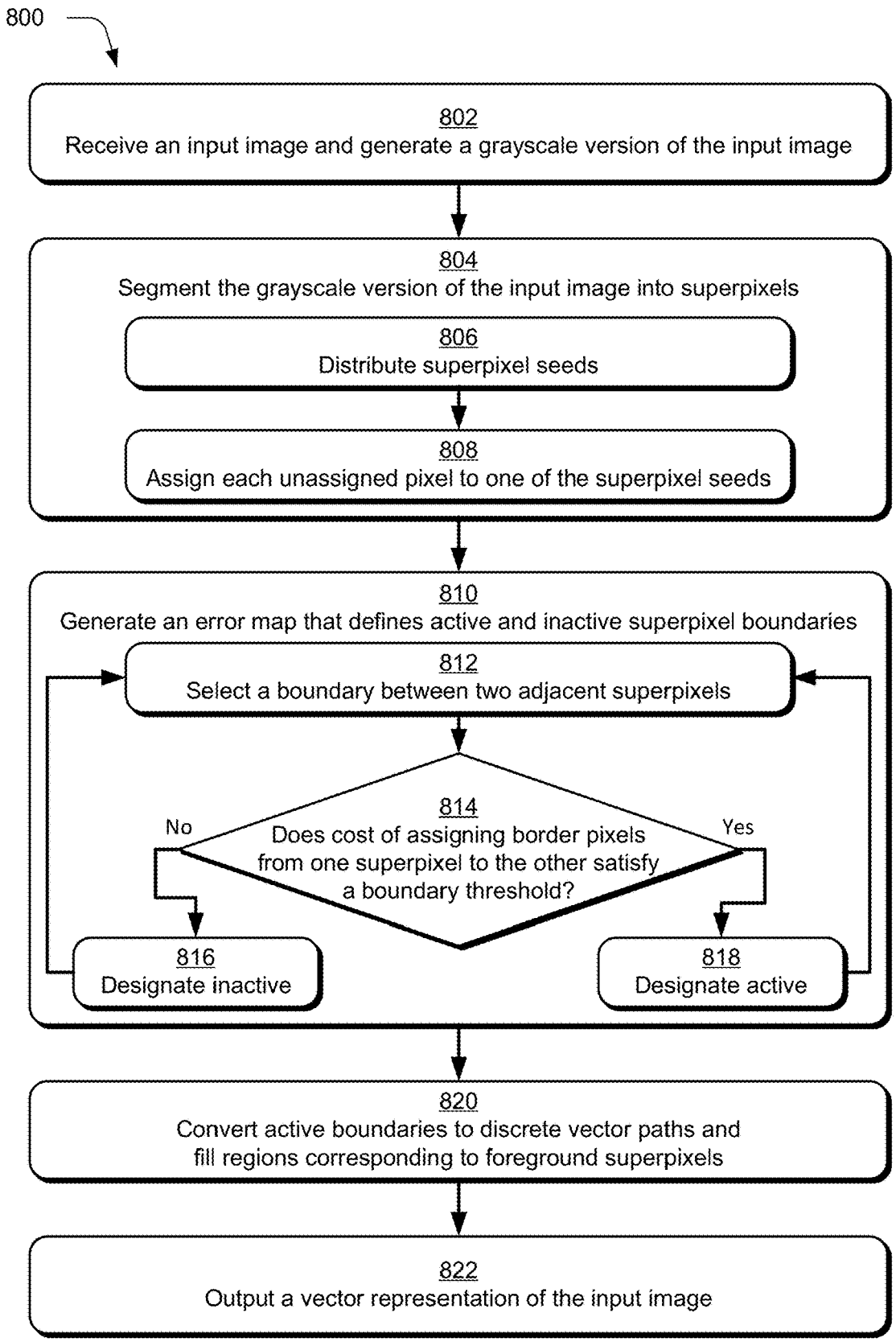
FIG. 8 is a flow diagram depicting a procedure in an example implementation of generating a vector representation of an input image using the techniques described herein.

FIG. 8 is a flow diagram depicting a procedure 800 in an example implementation of generating a vector representation of an input image using the techniques described herein.

To begin, an input image is received and a grayscale version of the input image is generated (block 802). The vectorization system 104, for instance, receives input image 106 and the grayscale module 202 generates grayscale image 204 from the input image 106. In implementations, the input image 106 is received from storage 110 of a computing device implementing the vectorization system 104, from a remote storage location (e.g., via network 112), or combinations thereof.

The grayscale version of the input image is then segmented into superpixels (block 804). As part of segmenting the grayscale version of the input image into superpixels, superpixel seeds are distributed (block 806) and each unassigned pixel is assigned to one of the superpixel seeds (block 808). The superpixel module 206, for instance, designates individual pixels of the image 302 as superpixel seeds and classifies each superpixel seed as either a foreground or background superpixel seed based on the pixel's value relative to a foreground threshold.

To ensure uniform distribution throughout the image 302, the superpixel module 206 enforces distances between superpixel seeds. The distances specify a first distance for spacing commonly classified superpixel seeds (e.g., spacing foreground superpixel seeds from one another or spacing background superpixel seeds from one another) and a second distance for spacing differently classified superpixel seeds (e.g., spacing foreground superpixel seeds from background superpixel seeds). After distributing superpixel seeds to the grayscale image 204 constrained by the first and second distances, the superpixel module 206 performs region growing to assign each pixel of the grayscale image 204 to one of the superpixel seeds.

To perform region growing, the superpixel module 206 builds a priority queue, where each entry in the priority queue represents a cost of assigning an unassigned pixel to an adjacent superpixel. The superpixel module 206 then determines a cost of assigning an unassigned pixel to an adjacent superpixel (e.g., of assigning pixel 404(1) to the superpixel seed represented by pixel 404) based on a difference between pixel values of an unassigned pixel and an adjacent pixel assigned to a superpixel. After initializing, the superpixel module 206 uses the lowest assignment cost to assign an unassigned pixel to a superpixel seed.

After each pixel assignment, the superpixel module 206 maintains a cumulative cost for each pixel relative to its associated superpixel seed and updates the priority queue to include entries defining assignment costs for possible assignments resulting from the previous pixel assignment. The superpixel module 206 continues to assign pixels based on a lowest cost in the priority queue, updating and reprioritizing the priority queue as additional pixels are assigned until each pixel of the grayscale image 204 is assigned to a superpixel.

An error map is then generated that defines active and inactive superpixel boundaries (block 810). To do so, a boundary between two adjacent superpixels is first selected (block 812). The superpixel module 206, for instance, selects a boundary between the first and second background superpixels, between the first and third background superpixels, or between the second and third background superpixels from the illustrated example of region 412. For the selected boundary, a determination of whether the cost of assigning border pixels from one superpixel to the other superpixel satisfies a boundary threshold is made (block 814).

To do so, the superpixel module 206 considers the cumulative costs associated with pixels disposed on the border of the adjacent pair of superpixels relative to the boundary threshold. If a difference between the cumulative costs of border pixels for one of the adjacent pair of superpixels relative to the cumulative costs of border pixels for the other one of the adjacent pair of superpixels fails to satisfy the boundary threshold, then the border is classified as an inactive boundary (block 816). Alternatively, if the difference between the cumulative costs of border pixels for one of the adjacent pair of superpixels relative to the cumulative costs of border pixels for the other one of the adjacent pair of superpixels satisfies the boundary threshold, then the border is classified as an active boundary (block 818). The superpixel module 206 records an active boundary in the error map 208 as an active boundary 214 and records an inactive boundary in the error map 208 as an inactive boundary 216.

An active boundary 214 thus represents presence of a salient curve or geometry near the border between a pair of adjacent superpixels while an inactive boundary 216 indicates an absence of a salient curve or geometry. In implementations where the two adjacent superpixels are classified differently from one another (e.g., one foreground superpixel and one background superpixel), the superpixel module 206 designates the border between the two superpixels as an active boundary 214. The superpixel module 206 is configured to repeat this process of classifying each border between adjacent superpixels for each pair of adjacent superpixels, as indicated by the arrows returning to block 812 from blocks 816 and 818.

After designating all boundaries between adjacent superpixel pairs as either active or inactive, active boundaries are converted to discrete vector paths and regions corresponding to foreground superpixels are filled (block 820). The curve generation module 218, for instance, generates one or more vector paths 220 using the active boundaries 214 in the error map 208. To do so, the curve generation module 218 regards the error map 208 as a pixel edge graph and identifies edges between pixel vertices along the active boundaries 214 as eligible candidates for defining one or more vector paths 220.

The curve generation module 218 then processes the identified edges using a curve vectorization algorithm to generate the one or more vector paths 220. The curve vectorization algorithm begins at an endpoint in the pixel edge graph and draws a vector path 220 by favoring edges that continue in a direction similar to a direction of the vector path 220 before intersecting a pixel vertex. At each pixel vertex junction including two possible edges for continuing the vector path 220, the curve vectorization algorithm is constrained to prefer continuing straight lines and to first define a vector path 220 along the longest preferred curve available in the pixel edge graph. The curve generation module 218 continues to define additional vector paths 220 greedily using subsequently available longest preferred curves, discarding active boundary edges corresponding to previously defined longest preferred curves until all active boundary edges have been assigned to a vector path.

After processing active boundaries 214 in the error map 208, the one or more vector paths 220 are provided to a fill module 222. The fill module 222 compares respective positions of the one or more vector paths 220 to the error map 208 and determines whether a region encompassed by one or more vector paths 220 corresponds to a foreground superpixel 210. In response to determining that an encompassed region corresponds to a foreground superpixel 210, the fill module 222 applies a pixel value associated with a superpixel seed of the foreground superpixel 210 to pixels in the encompassed region.

The vector representation of the input image is then output (block 822). The fill module 222, for instance, outputs the one or more vector paths 220 and optionally filled regions as the vector representation 114 of the input image 106. The vectorization system 104 is thus configured to generate a high-fidelity vector representation 114 of the input image 106, while minimizing vector paths 220 used to do so.

Having described example procedures in accordance with one or more implementations, consider now an example system and device to implement the various techniques described herein.

Example System and Device

Figure 9:
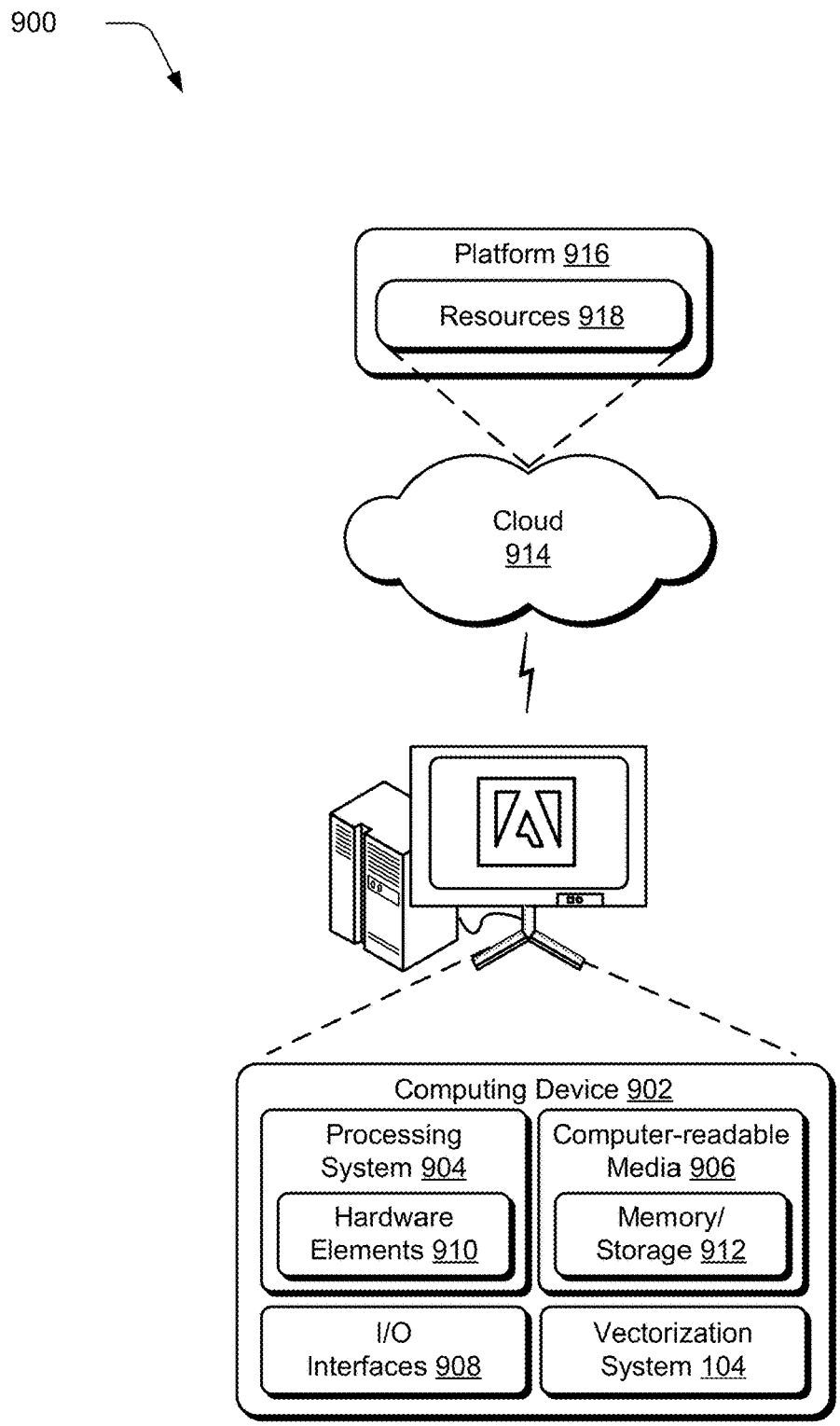
FIG. 9 illustrates an example system including various components of an example device to implement the techniques described with reference to FIGS. 1-8.

FIG. 9 illustrates an example system 900 that includes an example computing device 902, which is representative of one or more computing systems and/or devices that implement the various techniques described herein. This is illustrated through inclusion of the vectorization system 104. The computing device 902 is configured, for example, as a service provider server, as a device associated with a client (e.g., a client device), as an on-chip system, and/or as any other suitable computing device or computing system.

The example computing device 902 as illustrated includes a processing system 904, one or more computer-readable media 906, and one or more I/O interface 908 that are communicatively coupled, one to another. Although not shown, the computing device 902 is further configured to include a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that are configurable as processors, functional blocks, and so forth. For instance, hardware element 910 is implemented in hardware as an application specific integrated circuit or other logic device formed using one or more semiconductors. The hardware elements 910 are not limited by the materials from which they are formed, or the processing mechanisms employed therein. For example, processors are alternatively or additionally comprised of semiconductor(s) and/or transistors (e.g., electronic integrated circuits (ICs)). In such a context, processor-executable instructions are electronically executable instructions.

The computer-readable storage media 906 is illustrated as including memory/storage 912. The memory/storage 912 represents memory/storage capacity associated with one or more computer-readable media. The memory/storage 912 is representative of volatile media (such as random-access memory (RAM)) and/or nonvolatile media (such as read only memory (ROM), Flash memory, optical disks, magnetic disks, and so forth). The memory/storage 912 is configured to include fixed media (e.g., RAM, ROM, a fixed hard drive, and so on) as well as removable media (e.g., Flash memory, a removable hard drive, an optical disc, and so forth). In certain implementations, the computer-readable media 906 is configured in a variety of other ways as further described below.

Input/output interface(s) 908 are representative of functionality to allow a user to enter commands and information to computing device 902 and allow information to be presented to the user and/or other components or devices using various input/output devices. Examples of input devices include a keyboard, a cursor control device (e.g., a mouse), a microphone, a scanner, touch functionality (e.g., capacitive, or other sensors that are configured to detect physical touch), a camera (e.g., a device configured to employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is representative of a variety of hardware configurations as further described below to support user interaction.

Various techniques are described herein in the general context of software, hardware elements, or program modules. Generally, such modules include routines, programs, objects, elements, components, data structures, and so forth that perform particular tasks or implement particular data types. The terms "module," "functionality," and "component" as used herein generally represent software, firmware, hardware, or a combination thereof. The features of the techniques described herein are platform-independent, meaning that the techniques are configured for implementation on a variety of commercial computing platforms having a variety of processors.

An implementation of the described modules and techniques are stored on or transmitted across some form of computer-readable media. The computer-readable media include a variety of media that is accessible by the computing device 902. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information for access by a computer.

"Computer-readable signal media" refers to a signal-bearing medium that is configured to transmit instructions to the hardware of the computing device 902, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that is employed in some embodiments to implement at least some aspects of the techniques described herein, such as to perform one or more instructions. Hardware, in certain implementations, includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are employed to implement various techniques described herein. Accordingly, software, hardware, or executable modules are implemented as one or more instructions and/or logic embodied on some form of computer-readable storage media and/or by one or more hardware elements 910. The computing device 902 is configured to implement instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing system 904. The instructions and/or functions are executable/operable by one or more articles of manufacture (for example, one or more computing devices 902 and/or processing systems 904) to implement techniques, modules, and examples described herein.

The techniques described herein are supported by various configurations of the computing device 902 and are not limited to the specific examples of the techniques described herein. This functionality is further configured to be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 include applications and/or data that is utilized while computer processing is executed on servers that are remote from the computing device 902. Resources 918 also include services provided over the Internet and/or through a subscriber network, such as a cellular or Wi-Fi network.

The platform 916 is configured to abstract resources and functions to connect the computing device 902 with other computing devices. The platform 916 is further configured to abstract scaling of resources to provide a corresponding level of scale to encountered demand for the resources 918 that are implemented via the platform 916. Accordingly, in an interconnected device embodiment, implementation of functionality described herein is configured for distribution throughout the system 900. For example, in some configurations the functionality is implemented in part on the computing device 902 as well as via the platform 916 that abstracts the functionality of the cloud 914.

Conclusion

Although the invention has been described in language specific to structural features and/or methodological acts, the invention defined in the appended claims is not necessarily limited to the specific features or acts described. Rather, the specific features and acts are disclosed as example forms of implementing the claimed invention.

What is claimed is:

1. A method implemented by at least one computing device, the method comprising:
   receiving, by the at least one computing device, an input image;
   distributing, by the at least one computing device, superpixel seeds throughout the input image;
   growing, by the at least one computing device, superpixels from the superpixel seeds while maintaining a position of the superpixel seeds and a spacing between the superpixel seeds throughout the growing by assigning respective pixels in the input image to the superpixel seeds, pixels assigned to one of the superpixel seeds being separate from pixels assigned to other superpixel seeds throughout the growing;
   classifying, by the at least one computing device, a border between adjacent said superpixels grown from the superpixel seeds as an active boundary representing a salient curve in the input image;
   generating, by the at least one computing device, a vector path along the border; and
   outputting, by the at least one computing device, the vector path as a vector representation of the input image.

2. The method of claim 1, wherein, for each superpixel seed:
   the superpixel seed is classified as a foreground superpixel seed or a background superpixel seed based on an underlying pixel value of a corresponding location in the input image for the superpixel seed.

3. The method of claim 2, wherein, for each superpixel seed:
   the classifying as the foreground superpixel seed occurs is in response to determining that the underlying pixel value is less than or equal to 0.5; and
   the classifying as the background superpixel seed is in response to determining that the underlying pixel value is greater than 0.5.

4. The method of claim 2, wherein distributing the superpixel seeds comprises spacing background superpixel seeds from other background superpixel seeds at a first distance, spacing foreground superpixel seeds from other foreground superpixel seeds at the first distance, and spacing background superpixel seeds from foreground superpixel seeds at least at a second distance, where the first distance is an exact number of pixels.

5. The method of claim 1, wherein assigning respective pixels in the input image to the superpixel seeds comprises determining a cost associated with assigning one of the respective pixels to each neighboring pixel already assigned to one of the superpixel seeds and assigning the one of the respective pixels based on lowest associated cost.

6. The method of claim 5, wherein determining the cost associated with assigning the one of the respective pixels to one of the neighboring pixels already assigned to one of the superpixel seeds comprises determining a pixel value difference between the one of the respective pixels and the one of the neighboring pixels already assigned to one of the superpixel seeds.

7. The method of claim 5, further comprising designating the lowest associated cost as a cumulative cost for the one of the respective pixels responsive to assigning the one of the respective pixels to one of the superpixel seeds.

8. The method of claim 7, wherein the cumulative cost further reflects one or more cumulative costs associated with one or more intervening pixels connecting the one of the respective pixels to the one of the superpixel seeds.

9. The method of claim 1, wherein classifying the border between adjacent said superpixels as the active boundary comprises comparing a difference between cumulative costs associated with pixels along the border to a boundary threshold.

10. The method of claim 1, further comprising identifying a region encompassed by the vector path as corresponding to a foreground superpixel and assigning a pixel value associated with the foreground superpixel to pixels included in the region.

11. The method of claim 1, further comprising generating a grayscale version of the input image, the grayscale version of the input image including pixels having a first intensity representing one or more strokes in the input image and pixels having a second intensity representing a medium conveying the one or more strokes in the input image, wherein distributing the superpixel seeds comprises distributing the superpixel seeds throughout the grayscale version of the input image.

12. The method of claim 1, wherein assigning respective pixels in the input image to the superpixel seeds comprises:
   initializing a priority queue including entries representing costs for assigning the respective pixels to the superpixel seeds;
   determining the costs for one or more of the respective pixels adjacent to the superpixel seeds and updating corresponding entries in the priority queue based on the costs;
   ordering the entries in the priority queue to prioritize assignment of a first respective pixel of the respective pixels associated with an entry of the entries representing a lowest cost of the costs; and assigning the first respective pixel to a first superpixel seed of the superpixel seeds.

13. The method of claim 12, further comprising:
responsive to assigning the first respective pixel to the first superpixel seed:
determining a cost for assigning a second respective pixel to the first superpixel seed, the cost based at least in part on the assigning of the first respective pixel to the first superpixel seed;
updating the ordering of the entries in the priority queue based on the cost for assigning the second respective pixel to the first superpixel seed; and
assigning the second respective pixel or another respective pixel to one of the superpixel seeds based on the updated ordering.

14. The method of claim 1, further comprising:
determining a contiguous plurality of pixels of the input image associated with the border and a plurality of vertices corresponding to the plurality of pixels, where each vertex of the plurality of vertices is at a corner of a corresponding pixel of the plurality of pixels, and each vertex is along the active boundary;
determining an endpoint vertex of the plurality of vertices, where the endpoint vertex is adjacent to a single other vertex of the plurality of vertices; and
generating the vector path along the border includes forming edges between pairs of adjacent vertices of the plurality of vertices along the active boundary, where forming the edges includes:
forming a first edge from the endpoint vertex to the single other vertex adjacent to the endpoint vertex along the active boundary; and
beginning from the single other vertex at the first edge, forming subsequent contiguous additional edges between subsequent pairs of adjacent vertices of the plurality of vertices along the active boundary, where, for each additional edge of the additional edges, a direction of the additional edge is selected to correspond to a direction of another edge adjacent to the additional edge and formed previously to the additional edge.

15. One or more computer-readable storage media storing instructions that are executable by a computing device to perform operations comprising:
receiving an input image segmented into a plurality of regions;
classifying a border between an adjacent pair of regions in the plurality of regions as an active boundary representing a transition between foreground content of the input image and background content of the input image;
generating at least one vector path using edges between pixel vertices disposed on the border while the border is classified as the active boundary; and
outputting the at least one vector path as a vector representation of the input image in an order of strokes of the input image.

16. The one or more computer-readable storage media of claim 15, the operations further comprising segmenting the input image into the plurality of regions by distributing a plurality of superpixel seeds throughout the input image and growing a superpixel from each of the plurality of superpixel seeds, wherein each of the plurality of regions is defined by one of the plurality of superpixels.

17. The one or more computer-readable storage media of claim 15, the operations further comprising identifying a region encompassed by the at least one vector path as corresponding to the foreground content of the input image and assigning a pixel value associated with the foreground content of the input image to pixels included in the region.

18. The one or more computer-readable storage media of claim 15, wherein classifying the border between the adjacent pair of regions in the plurality of regions as the active boundary comprises comparing a difference between cumulative costs associated with pixels along the border to a boundary threshold, the cumulative costs defined based on differences between adjacent pixel values in the input image.

19. The one or more computer-readable storage media of claim 15, wherein generating the at least one vector path is performed using a vector curve algorithm configured to prioritize defining vector paths based on curve length and angles between different ones of the edges.

20. A system, comprising:
one or more processors; and
a computer-readable storage medium storing instructions that are executable by the one or more processors to perform operations comprising:
generating a grayscale version of an input image;
distributing a plurality of superpixel seeds throughout the grayscale version of the input image;
growing superpixels from the plurality of superpixel seeds while maintaining a position of the superpixel seeds and a spacing between the superpixel seeds throughout the growing by assigning pixels in the grayscale version of the image to respective superpixel seeds of the plurality of superpixel seeds, pixels assigned to one of the superpixel seeds being separate from pixels assigned to other superpixel seeds throughout the growing;
classifying a border between an adjacent pair of the superpixels as an active boundary representing a sketch stroke in the input image;
generating one or more vector paths along the border; and
outputting the one or more vector paths as a vector representation of the input image.

* * * * *